United States Patent
Inaba et al.

(10) Patent No.: US 10,370,001 B2
(45) Date of Patent: Aug. 6, 2019

(54) COAST-STOP CONTROL DEVICE

(71) Applicant: Hitachi Automotive Systems, Ltd., Hitachinaka-shi, Ibaraki (JP)

(72) Inventors: Ryoh Inaba, Tokyo (JP); Masayuki Saruwatari, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 123 days.

(21) Appl. No.: 15/542,514

(22) PCT Filed: Jan. 8, 2016

(86) PCT No.: PCT/JP2016/050420
§ 371 (c)(1),
(2) Date: Jul. 10, 2017

(87) PCT Pub. No.: WO2016/121451
PCT Pub. Date: Aug. 4, 2016

(65) Prior Publication Data
US 2018/0265089 A1    Sep. 20, 2018

(30) Foreign Application Priority Data
Jan. 26, 2015 (JP) .................. 2015-011926

(51) Int. Cl.
*B60W 30/18* (2012.01)
*B60W 10/02* (2006.01)
(Continued)

(52) U.S. Cl.
CPC ...... *B60W 30/18072* (2013.01); *B60W 10/02* (2013.01); *B60W 10/06* (2013.01);
(Continued)

(58) Field of Classification Search
CPC .............................................. B60W 30/18072
See application file for complete search history.

(56) References Cited

U.S. PATENT DOCUMENTS

| 6,265,990 B1 | 7/2001 | Isogai et al. |
| 2010/0184562 A1 | 7/2010 | Senda et al. |

(Continued)

FOREIGN PATENT DOCUMENTS

| EP | 1 475 265 A2 | 11/2004 |
| EP | 2 436 953 A2 | 4/2012 |

(Continued)

OTHER PUBLICATIONS

International Search Report (PCT/ISA/210) issued in PCT Application No. PCT/JP2016/050420 dated Apr. 12, 2016 with English translation (5 pages).

(Continued)

*Primary Examiner* — Derek D Knight
(74) *Attorney, Agent, or Firm* — Crowell & Moring LLP

(57) ABSTRACT

The purpose of the present invention is to provide a coast-stop control device that makes it possible to change gears to an appropriate gear change while traveling, before the engine is stopped. The present invention is a coast-stop control device for performing coast-stop control that automatically stops an engine while the vehicle is traveling, the coast-stop control device being characterized: in being provided with an engine stop condition-assessing means for assessing whether it is possible to stop the engine and a gear change control means for controlling the gear change ratio of a gear change mechanism; and in controlling the gear change mechanism to a prescribed gear change ratio when the engine stop condition-assessing means determines that an engine stop condition has been met.

3 Claims, 8 Drawing Sheets

(51) Int. Cl.
- *B60W 10/06* (2006.01)
- *B60W 10/10* (2012.01)
- *F02D 29/02* (2006.01)
- *F02D 29/06* (2006.01)
- *B60W 10/08* (2006.01)
- *B60W 50/10* (2012.01)
- *F01M 1/02* (2006.01)
- *F16H 59/18* (2006.01)
- *F16H 61/04* (2006.01)

(52) U.S. Cl.
CPC ............ *B60W 10/08* (2013.01); *B60W 10/10* (2013.01); *B60W 50/10* (2013.01); *F01M 1/02* (2013.01); *F02D 29/02* (2013.01); *F02D 29/06* (2013.01); *B60W 2030/1809* (2013.01); *B60W 2520/10* (2013.01); *B60W 2540/10* (2013.01); *B60W 2550/308* (2013.01); *B60W 2710/086* (2013.01); *B60W 2710/1005* (2013.01); *B60W 2710/30* (2013.01); *F01M 2001/0215* (2013.01); *F01M 2001/0269* (2013.01); *F16H 2059/186* (2013.01); *F16H 2061/0496* (2013.01); *Y02T 10/76* (2013.01)

(56) References Cited

U.S. PATENT DOCUMENTS

| | | |
|---|---|---|
| 2012/0083388 A1 | 4/2012 | Watanabe et al. |
| 2012/0135841 A1* | 5/2012 | Watanabe ........... B60W 10/026 477/115 |
| 2013/0289830 A1 | 10/2013 | Kamiya et al. |

FOREIGN PATENT DOCUMENTS

| | | |
|---|---|---|
| JP | 2010-164143 A | 7/2010 |
| JP | 2012-77840 A | 4/2012 |
| JP | 2012-112463 A | 6/2012 |
| JP | 2014-126030 A | 7/2014 |
| WO | WO 2012/090924 A1 | 7/2012 |

OTHER PUBLICATIONS

Japanese-language Written Opinion (PCT/ISA/237) issued in PCT Application No. PCT/JP2016/050420 dated Apr. 12, 2016 (4 pages).
Extended European Search Report issued in counterpart European Application No. 16743055.2 dated Sep. 13, 2018 (nine (9) pages).

* cited by examiner

COAST-STOP CONTROL DEVICE

TECHNICAL FIELD

The present invention relates to vehicles such as automobiles, and particularly relates to a coast-stop control device of a vehicle with an automatic transmission. The present invention relates to a vehicle field of a travel control technology.

BACKGROUND ART

Vehicles with an engine that automatically stops when vehicles are stopped during traveling and a prescribed engine stop condition is met to improve fuel economy, reduce exhaust emission, or reduce noise have been proposed and brought into practical use. Meanwhile, a coast-stop vehicle capable of further reducing fuel consumption by adapting an engine stop condition of automatically stopping an engine even during traveling has also been proposed (e.g., see PTL 1). Further, a technique to supply a hydraulic pressure to an after-shift frictional engagement element to realize a gear position after a downshift of the transmission during the coast-stop has been proposed, because it takes time to downshift the transmission and start the engine when an acceleration request is received from the driver during coast-stop (e.g., see PTL 2).

CITATION LIST

Patent Literature

PTL 1: JP2010-164143 A
PTL 2: JP2012-112463 A

SUMMARY OF INVENTION

Technical Problem

In the past technologies, the gear change control is performed regardless of the state of the preceding vehicle, so that an appropriate gear change ratio cannot be attained if a vehicle comes close to the preceding vehicle or travels slowly. The gear change ratio, therefore, should be optimized, taking longer time to restart acceleration. Meanwhile, if the coast-stop state continues for along time, a shortage of power of the battery for an electric oil pump, which maintains the hydraulic pressure in the vehicle, may occur.

It is, therefore, an object of the present invention to provide a coast-stop control device capable of changing gears to an appropriate gear position before the engine-stop state occurs during the travel.

Solution to Problem

The present invention provides a coast-stop control device configured to perform coast-stop control that automatically stops an engine while a vehicle is traveling, the vehicle including a power transmission mechanism capable of switching between an engagement state in which the power transmission mechanism is connected to an output shaft of an engine to allow transmission of a driving force and a release state in which the engagement is released, a gear change mechanism connected to the output shaft of the power transmission mechanism and capable of changing the gear change ratio, an operating oil supply pump capable of operating in synchronism with a rotation of the output shaft of the engine, and an electric oil pump operating while the engine is automatically stopped, the coast-stop control device includes an engine-stop-condition determination unit configured to determine whether the engine stop is possible, and a gear change control unit configured to control the gear change ratio of the gear change mechanism, wherein the gear change mechanism is controlled to change to a prescribed gear change ratio when the engine-stop-condition determination unit determines that the engine stop condition is met.

Advantageous Effects of Invention

According to the present invention, a delay in responding to an acceleration request can be decreased when acceleration restarts by the driver operating the acceleration pedal while the vehicle travels with the engine stopped.

DESCRIPTION OF EMBODIMENTS

The embodiment of the present invention will be described below by referring to the accompanying drawings.

First Embodiment

Figure 1:
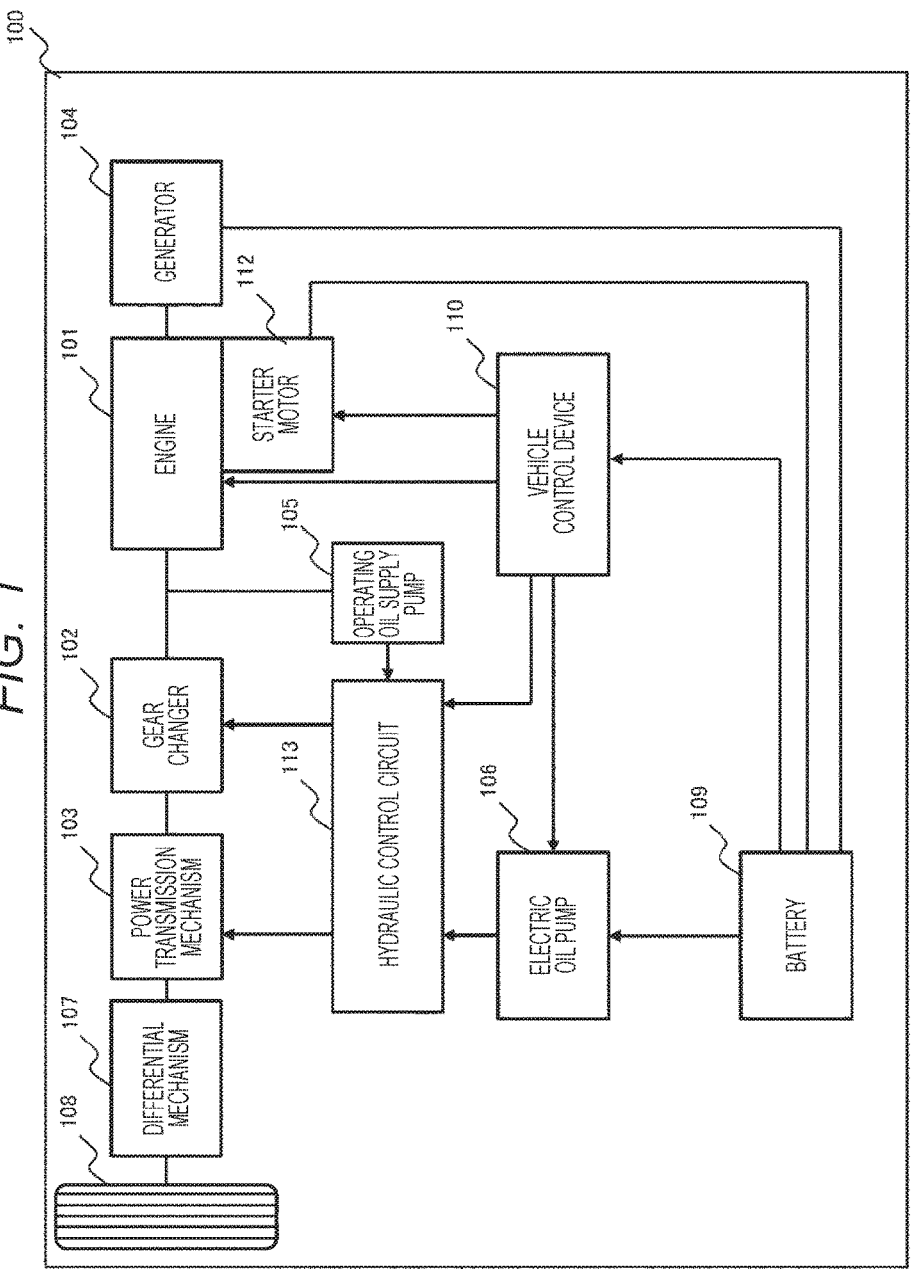
FIG. 1 is a block diagram illustrating a configuration of a travel drive system of a coast-stop vehicle according to the present invention.

FIG. 1 illustrates a configuration of a vehicle with a vehicle control device according to a first embodiment of the present invention. A vehicle 100 includes an engine 101 that generates a driving force, and the driving force generated by the engine 101 is transmitted through a gear changer 102 to driving wheels 108 via a power transmission mechanism 103 and a differential mechanism 107 in order to travel the vehicle 100.

The gear changer 102 is not limited to a continuously variable transmission combining a belt or chain with pulleys, and may be a multistage transmission combined with a planetary gear mechanism. Alternatively, the gear changer may be formed by combining the continuously variable transmission and the multistage transmission.

The gear changer 102 is associated with a power transmission mechanism 103 capable of controlling a power transmission amount between the engine 101 and the differential mechanism 103. The power transmission mechanism 103 can adjust the power transmission amount between the engine 101 and the driving wheels 108 to allow the engine 101 to stop during traveling. The power transmission mechanism 103 may be formed by a torque converter, dry or wet clutches, or a planetary gear mechanism. Alternatively, a lock-up clutch in the torque converter may be used.

A starter motor 112 is assembled as an engine starting device. The starter motor 112 is operated by electric power supplied from a battery 109 to start combustion following rotations of the engine 101. The engine starter may not be limited to the starter motor 112, and may be any motor that can function as a starter motor and a power generator.

The battery 109 is a storage device capable of cranking the engine 101 and may be formed using any of a lead battery, a nickel-hydride battery, a lithium-ion battery, an electric double layer capacitor, or a lithium-ion capacitor. In addition, the battery 109 may include a battery level detecting sensor capable of detecting a remaining battery level, so that the vehicle control device 110 can determine whether the coast-stop is permitted in accordance with the information from the sensor.

An operating oil supply oil pump 105 for generating a hydraulic pressure used in the vehicle 100 is connected to the crank shaft of the engine 101 via the drive belt to continuously supply the hydraulic pressure while the engine 101 is operated.

An electric oil pump 106 that can be operated by receiving electric power from the battery 109 is provided. If it is determined that the supply of the hydraulic power by the operating oil supply oil pump 105 is insufficient while, for example, the engine is stopped, a motor is driven by a motor driver in the electric oil pump to supply a necessary hydraulic pressure. The electric oil pump 106 includes an oil pump body and an electric motor with an associated motor driver that rotationally operates the oil pump body. The electric oil pump 106 may not be a pump capable of continuously controlling the driving output variably by a motor driver, and may be a pump capable of controlling only on-off of the output by a relay.

Even when the engine 101 is operated, the electric oil pump 106 may be operated to supplement the shortage of supply of the cooling oil or lubricating oil by the operating oil supply oil pump 105. Thus, the operation of the electric oil pump 106 is not limited to the time when the engine 101 is temporarily stopped.

In addition, a hydraulic control circuit 113 is provided for adjusting and supplying a hydraulic pressure generated by the operating oil supply oil pump 105 and the electric oil pump 106 to the gear changer 102 and the power transmission mechanism 103. The hydraulic control circuit 113 controls a hydraulic control valve or a stepper motor in hydraulic circuits to achieve a gear change ratio or a crutch state calculated by the vehicle control device 110.

Figure 2:
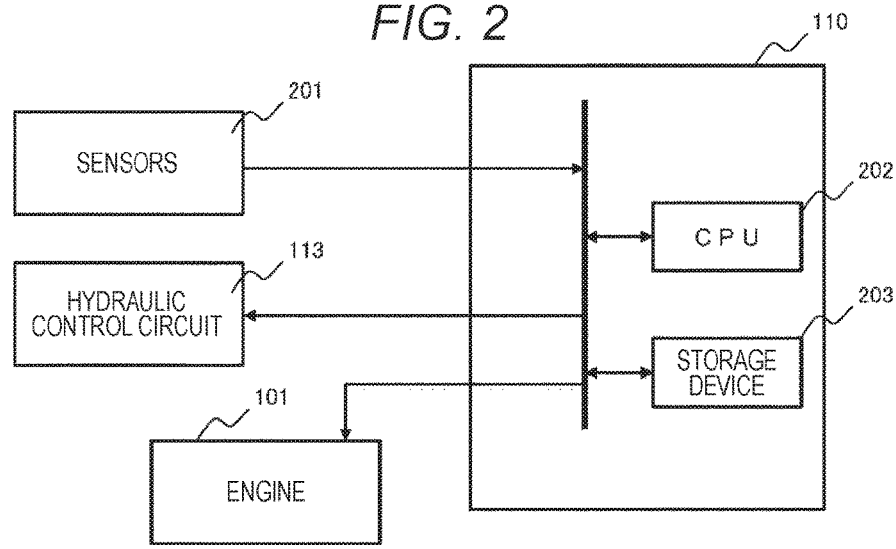
FIG. 2 is a block diagram illustrating a configuration of a vehicle control device.

The vehicle control device 110 is a controller for integrally controlling the engine 101 or the gear changer 102 and the power transmission mechanism 103 that are controlled by the hydraulic control circuit 113, and includes a CPU 202, a storage device 203, and an interface for communicating with other controllers and sensors, as illustrated in FIG. 2.

The vehicle control device 110 calculates, by the CPU 202, signals representing a target gear change ratio, a state of the power transmission mechanism 103, a control signal for driving the electric oil pump, ignition timing, and a fuel injection amount for the hydraulic control circuit 113 and the engine 101. The calculation is based on the information obtained by the sensors 201, such as a vehicle speed sensor, an accelerator pedal opening angle sensor, or a brake switch sensor, for detecting the vehicle state, input and output rotation numbers of the gear changer 102, or the state of the hydraulic pressure in the hydraulic control circuit, the information from an external recognition device 111, or the information stored in the storage device 203.

Figure 3:
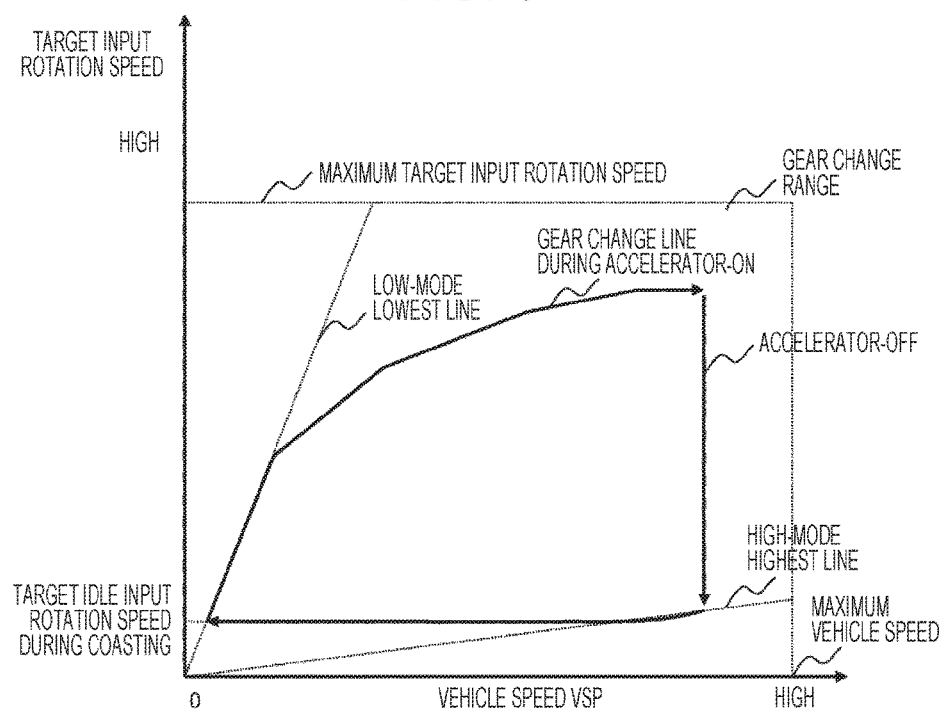
FIG. 3 illustrates gear change control in acceleration and coasting.

FIG. 3 illustrates one example of a gear change map stored in the storage device 203 during coasting without accompanying the engine stop. A target input rotation is calculated in accordance with a vehicle speed and an accelerator pedal opening angle. Arrows in the drawing indicate a target input rotation speed of the gear changer 102 when deceleration for coasting is carried out after the vehicle is accelerated from the stop state. A target rotation speed for attaining the low-mode lowest gear change ratio is directed until the vehicle reaches a prescribed vehicle speed from the stop state. As the vehicle speed increases, the target rotation speed gradually approaches the HIGH side. The gear change, however, may be continuously carried out on the LOW side depending on, for example, a gradient. When the accelerator is off at a speed equal to or higher than the prescribed vehicle speed, the gear change is carried out along the high-mode highest line of the gear change ratio. When the target input rotation speed falls below the target idle input rotation speed during coasting, the gear change is carried out so that the vehicle speed changes toward the LOW side to maintain the rotation speed.

The vehicle control device 110 calculates the optimal gear change ratio and the state of the power transmission mechanism 103 according to the gear change map during the coasting without accompanying the engine stop, and sends the calculation result, as an instruction value, to the hydraulic control circuit 113 and the electric oil pump 106.

Figure 4:
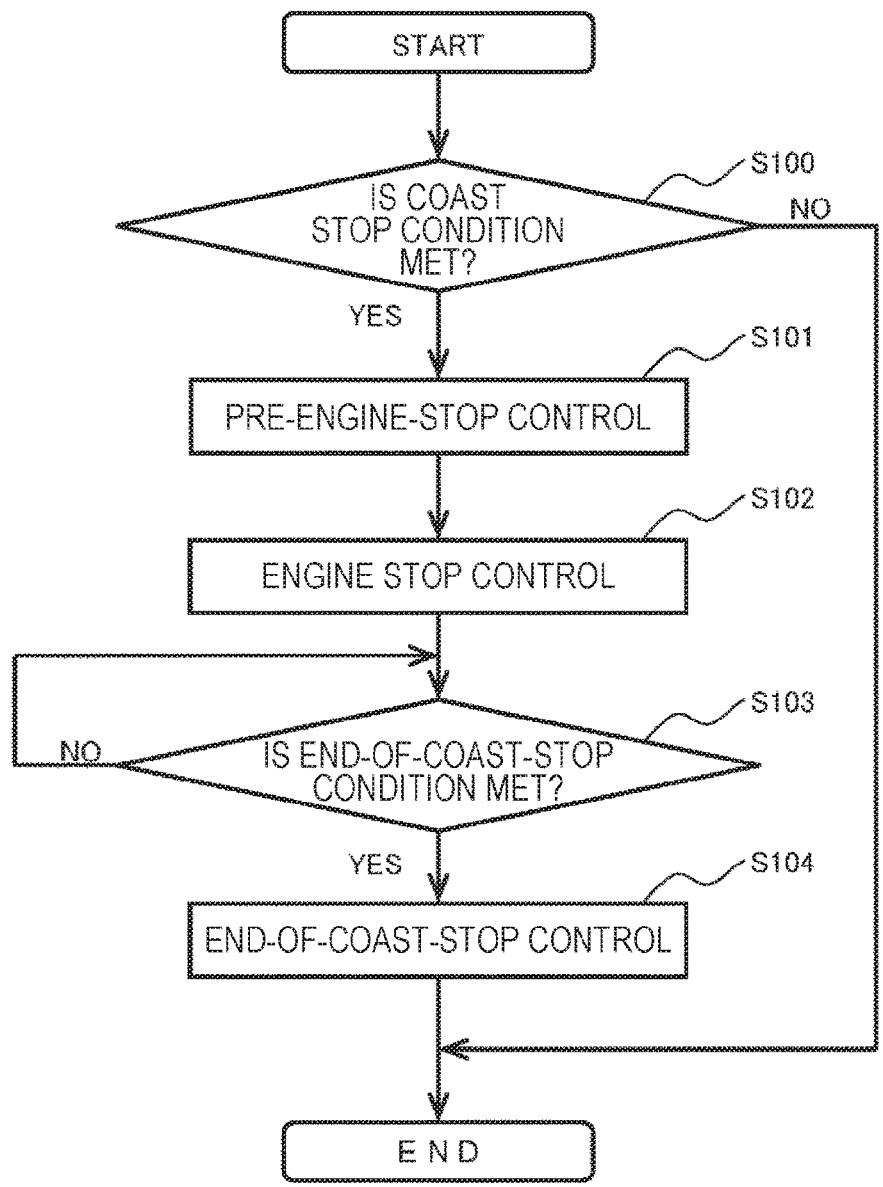
FIG. 4 is a flowchart illustrating control content executed by the vehicle control device between deceleration of speed and restart of acceleration.

Next, a deceleration processing control covering the engine stop during travel, which is implemented on the vehicle control device 110 of the present invention, is described by referring to a flowchart of FIG. 4.

In step S100, the vehicle control device 110 determines whether all coast-stop conditions that have been prescribed are met, the prescribed coast-stop conditions including the vehicle speed not exceeding a prescribed speed, the accelerator pedal opening angle not exceeding a prescribed angle, the driving force of the engine 101 transmitted by the power transmission mechanism 103 to the driving wheels 108 not exceeding a prescribed amount, the hydraulic pressure supply to the hydraulic control circuit 113 not falling below a prescribed value, the electric oil pump 106 being not determined abnormal, and the battery level not falling below a prescribed level. When it is determined that the above coast-stop conditions are met, the process proceeds to the processing of step S101, otherwise the deceleration processing control is ended.

In step S101, the vehicle control device 110 performs pre-engine-stop control. The pre-engine-stop control calculates, before stopping the engine 101, an instruction value to the power transmission mechanism 103 and the gear changer 102, both subjected to hydraulic control by the hydraulic control circuit 113.

In step S102, the vehicle control device 110 performs the engine stop control. The engine stop control controls a fuel injection valve to stop the fuel supply to the engine 101.

In step S103, the vehicle control device 110 determines whether a prescribed end-of-coast-stop condition is met. It is determined whether any one of the end-of-coast-stop conditions is met, the end-of-coast-stop conditions including the vehicle speed not exceeding a prescribed speed, the accelerator pedal opening angle exceeding a prescribed angle, the hydraulic pressure supply to the hydraulic control circuit 113 not exceeding a prescribed value, the electric oil pump 106 being determined abnormal, and the battery level not exceeding a prescribed level. If it is determined that such end-of-coast-stop conditions are met, the process proceeds to step S104, otherwise the process continues the engine stop state.

In step S104, the vehicle control device 110 performs end-of-coast-stop control. The end-of-coast-stop control performs start processing of the engine 101. The engine 101 starts by a starter start using the fuel injection valve to resume fuel supply to the engine 101, while supplying electric power to the starter motor 112 to start rotational movement of the engine 101, or by a push start using rotational energy of the driving wheels 108 to control the power transmission mechanism 103 to start the engine 101. By performing either one of these starting methods, the combustion of the engine resumes.

Figure 5:
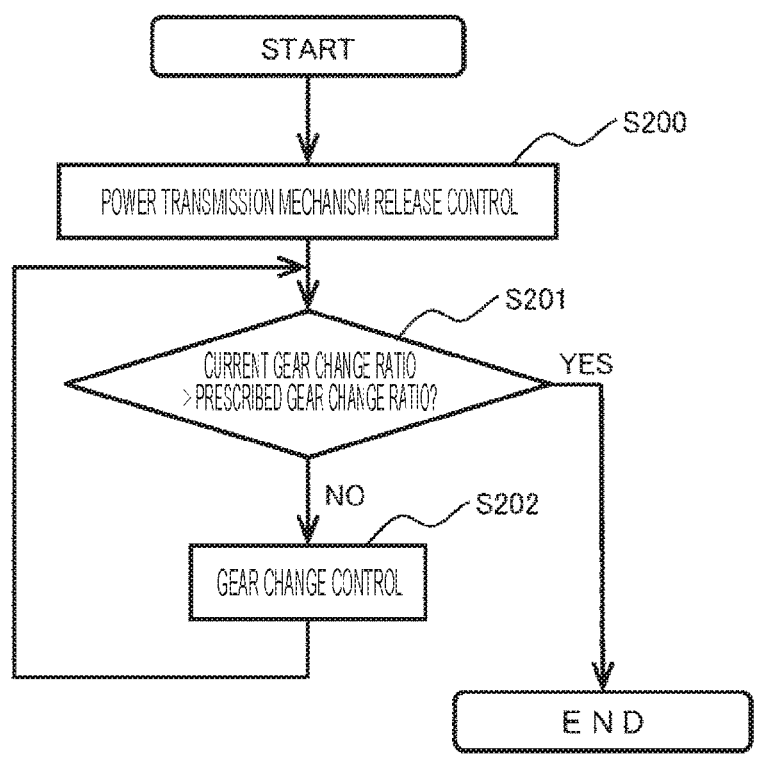
FIG. 5 is a flowchart illustrating content of pre-engine-stop control executed by the vehicle control device.

FIG. 5 illustrates the pre-engine-stop control of S101 according to the first embodiment of the present invention.

In step S200, the vehicle control device 110 performs the power transmission mechanism release control. The hydraulic pressure of the hydraulic control circuit 113 is adjusted so that the driving force of the engine 101 transmitted to the driving wheels 108 by the power transmission mechanism 103 becomes nearly zero. This prevents a friction torque of the engine 101 acting in a decelerating direction of the vehicle 100 from transmitting to the driving wheels 108, so that the vehicle 100 cannot easily decelerate. Thus, the energy efficiency of the entire vehicle can be improved, which leads to attaining a fuel consumption reducing effect.

In step S201, the vehicle control device 110 determines that the current gear change ratio of the gear changer 102 is larger than the prescribed gear change ratio. When the current gear change ratio of the gear changer 102 is larger than the prescribed gear change ratio, the pre-engine-stop control processing is ended. When the current gear change ratio of the gear changer 102 is not larger than the prescribed gear change ratio, the process proceeds to step S202.

In step S202, the vehicle control device 110 performs gear change control. The gear change control continues to give an instruction to the hydraulic control circuit 113 until the current gear change ratio of the gear changer 102 reaches the prescribed gear change ratio.

Next, the effect and advantage by performing the above control is described.

Figure 6:
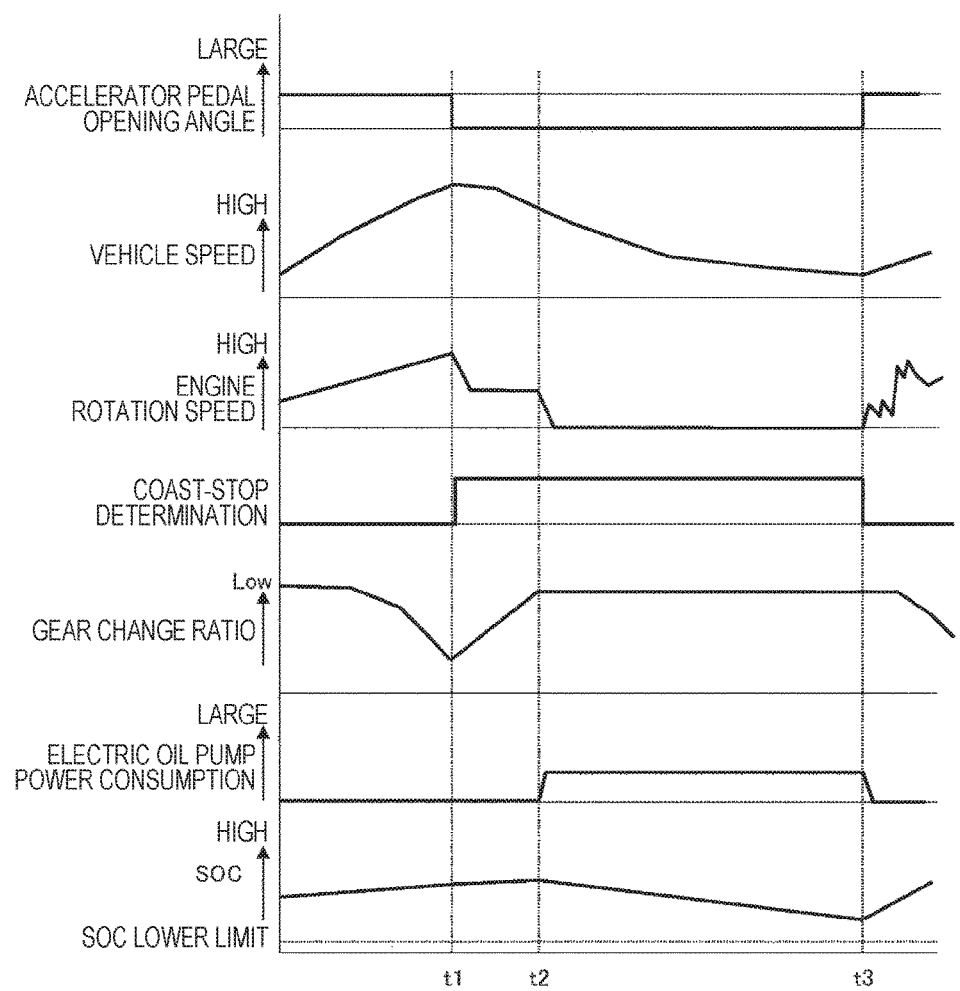
FIG. 6 is a time chart for explaining an effect and advantage of the present embodiment.

FIG. 6 is a time chart when the above-mentioned control is carried out.

At time t1, the coast-stop condition is met at the time of accelerator-off by the driver. Accordingly, the gear change starts so that the gear change ratio approaches the LOW side.

At time t2, the current gear change ratio is larger than the prescribed gear change ratio, and the engine stop processing is carried out. To maintain the gear change ratio, the electric oil pump 106 is controlled so as to maintain its output.

At time t3, when an acceleration restart request is received from the driver by the operation of the accelerator pedal, the engine 101 that has started by the end-of-coast-stop control generates power and transmits the power to the driving wheels 108 via the power transmission mechanism 103. Since the gear change ratio has been moved to the LOW side compared to the prescribed gear change ratio before the engine stop, the gear change is not necessary in restarting acceleration from the coast-stop state, thus decreasing time for restarting acceleration.

Second Embodiment

Figure 7:
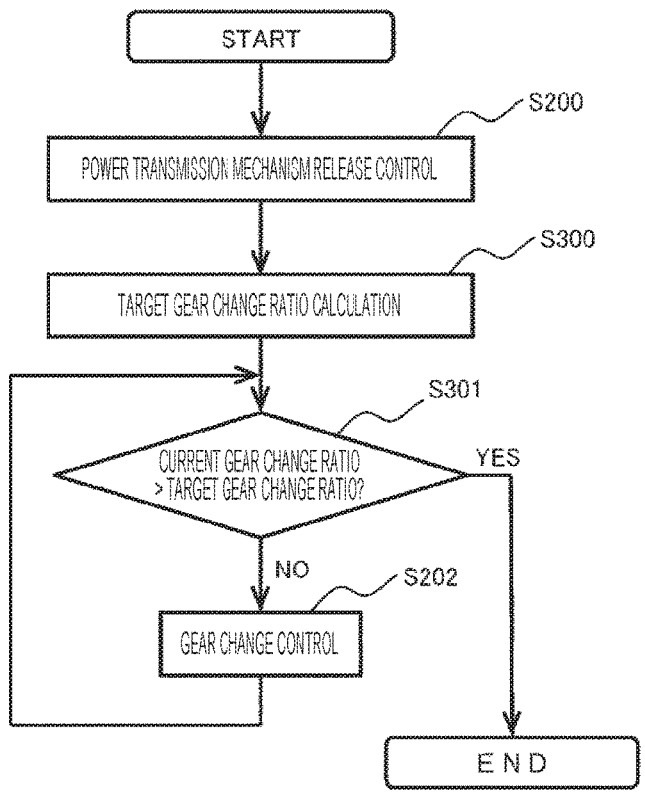
FIG. 7 is a flowchart illustrating control content executed by the vehicle control device between deceleration of speed and restart of acceleration.

FIG. 7 illustrates the pre-engine-stop control S101 implemented on an on-vehicle power supply unit 106 according to a second embodiment of the present invention.

The vehicle 100 of the present embodiment includes an external recognition device as one of the sensors 201 for obtaining information to be input to the vehicle control device 110. The external recognition device detects a surrounding state of the vehicle, and obtains a relative speed or a distance between the vehicle and the preceding vehicle. Example methods to recognize the external state include a camera or a radar mounted on the vehicle 100, a reception device of a GPS signal and map information, communication with the data center, the vehicle state relative to the preceding and surrounding vehicles, or communication means configured to communicate with signals and signs installed on the roads.

In step S300, the vehicle control device 110 performs the target gear change ratio calculation in accordance with the information obtained by the external recognition device.

Figure 8:
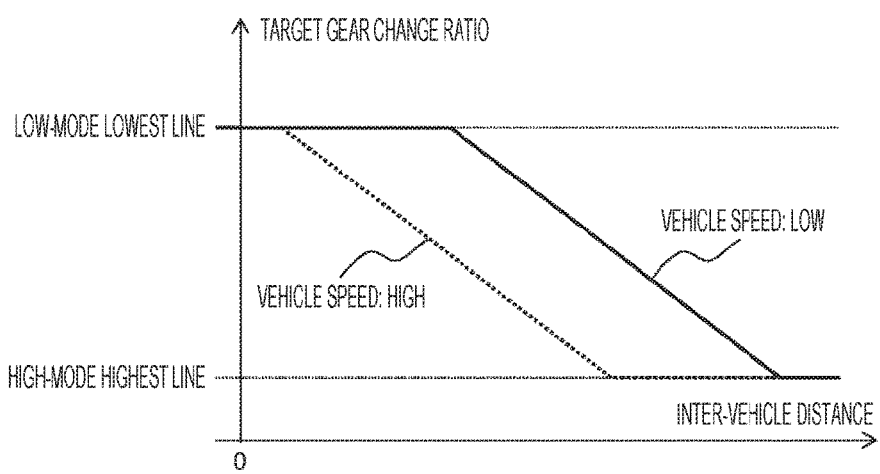
FIG. 8 is a graph illustrating a target gear change ratio before the engine stop relative to an inter-vehicle distance and vehicle speed when the accelerator is off.

FIG. 8 illustrates a map of the target gear change ratio during coasting that accompanies the engine stop, the map being stored in the storage device 203 to be used for calculation of the target gear change ratio. At the time of accelerator-off by the driver, the target gear change ratio before the engine stop is calculated in accordance with an inter-vehicle distance between the vehicle and the preceding vehicle obtained from the external recognition device.

As used herein, the inter-vehicle distance represents a distance between the vehicle and a vehicle preceding to the vehicle. When the inter-vehicle distance and the vehicle speed are large, it is highly expected that the gear change ratio is on the HIGH side when the driver restarts acceleration by stepping on the accelerator pedal. On the contrary, when both the inter-vehicle distance and vehicle speed are small, it is highly expected that the gear change ratio during the restart of acceleration is on the LOW side. By determining a pre-engine-stop gear change ratio in accordance with the inter-vehicle distance and the vehicle speed at the time of accelerator-off, the gear change amount in restart acceleration can be minimized and an acceleration delay in restarting acceleration can be decreased.

In step S301, the vehicle control device 110 compares the current gear change ratio with the target gear change ratio calculated in step S300. If the current gear change ratio is larger than the target gear change ratio, the pre-engine-stop control is ended. If the current gear change ratio is smaller than the target gear change ratio, step S200 is executed.

As described above, by changing the current gear change ratio to the LOW side before the engine 101 is stopped to avoid unnecessary gear change during the coast-stop, the output of the electric oil pump 106 can be lowered and the time taken for the gear change to restart acceleration can be shortened, while the power usage of the battery 109 can be reduced.

Next, the effect and advantage by performing the above control is described.

Figure 9:
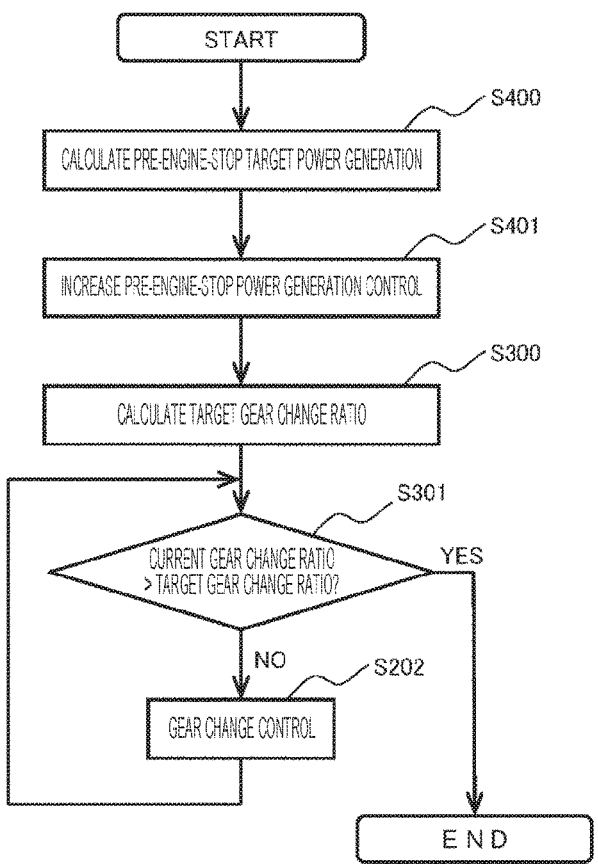
FIG. 9 is a flowchart illustrating control content executed by the vehicle control device between deceleration of speed and restart of acceleration.

FIG. 9 is a time chart of performing the above-described control. At time t11, the coast-stop condition is met at the time of accelerator-off.

Third Embodiment

FIG. 9 illustrates the pre-engine-stop control S101 implemented on the on-vehicle power supply unit 106 according to a third embodiment of the present invention.

In step S400, the vehicle control device 110 calculates a pre-engine-stop target power generation. A pre-engine-stop target SOC is calculated in accordance with the information obtained by the external recognition device.

Figure 10:
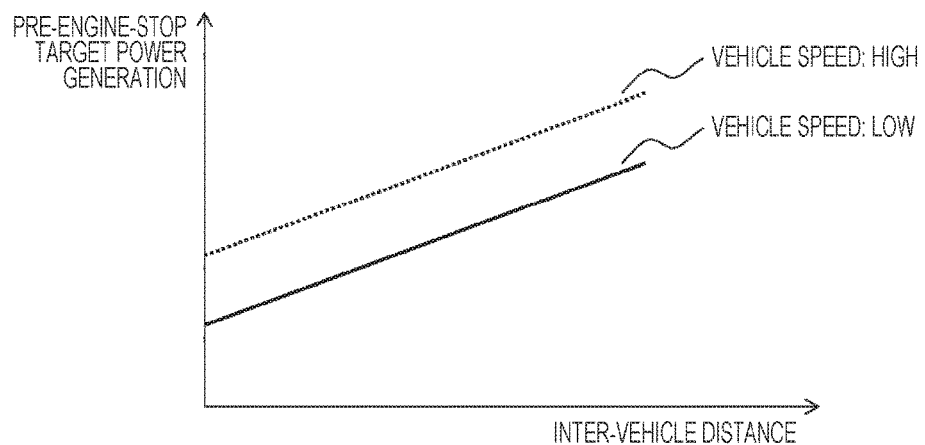
FIG. 10 is a graph illustrating a target power generation before the engine stop relative to an inter-vehicle distance and vehicle speed when the accelerator is off.

FIG. 10 illustrates a map of the target pre-engine-stop target power generation stored in the storage device 203 and used in calculating the pre-engine-stop target power generation. The pre-engine-stop target power generation is calculated at the accelerator-off timing by the driver in accordance with the inter-vehicle distance between the vehicle and the preceding vehicle and the vehicle speed obtained by the external recognition device.

When the inter-vehicle distance is large and the vehicle speed is high, it is expected that the coast-stop time becomes longer until the driver steps the accelerator pedal again to restart acceleration. At the same time, the hydraulic pressure is higher as the vehicle speed increases, in order to maintain the gear change. It is, therefore, necessary to increase the level of the battery 109 before the engine 101 is stopped. This decreases the battery level of the battery 109 during the coast-stop, thus decreasing the opportunity to stop continuing the coast-stop. On the contrary, if the vehicle speed is low and the inter-vehicle distance is small, it is expected that the vehicle 100 is going to stop, so that it is not necessary to increase the hydraulic pressure to maintain the gear change ratio nor increase the power generation amount. Thus, the target power generation is decreased.

Next, the effect and advantage by performing the above control is described.

Figure 11:
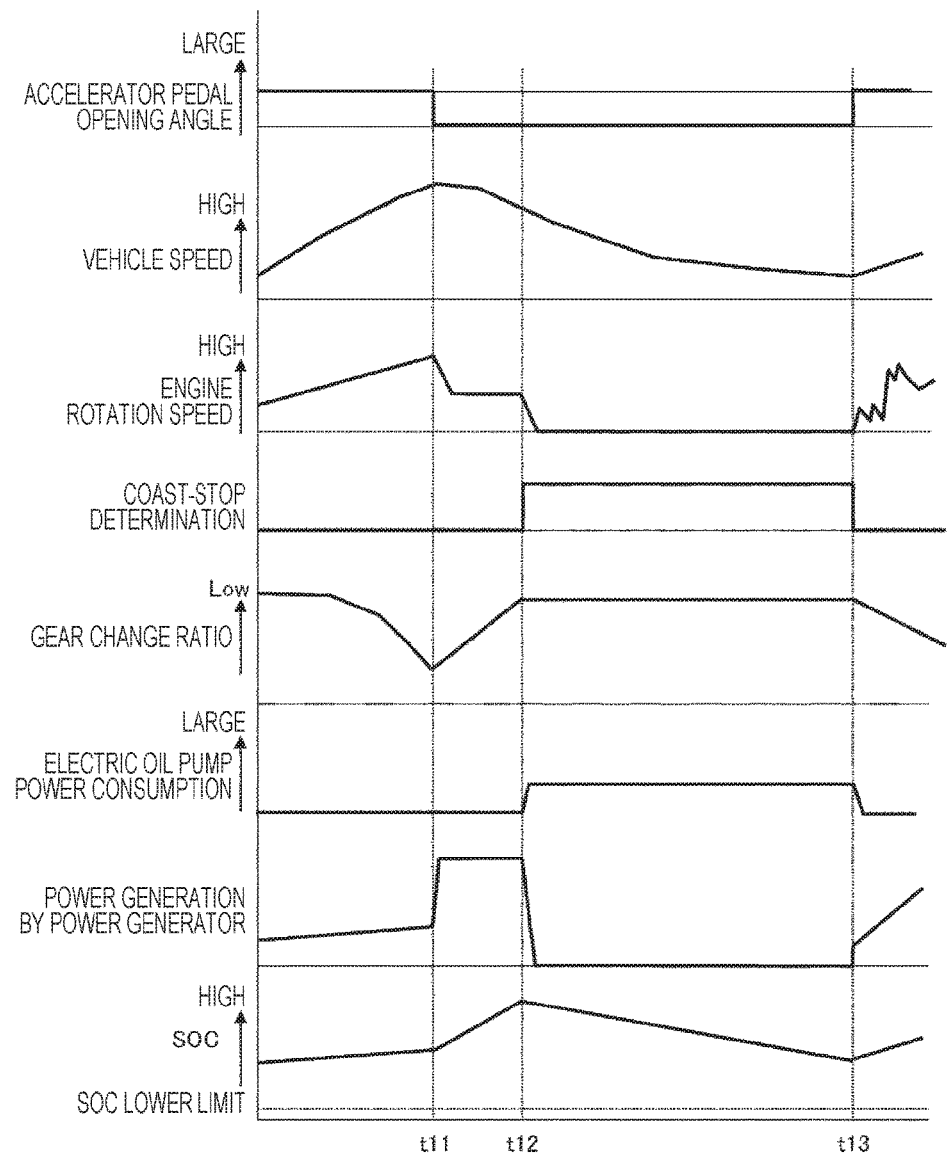
FIG. 11 is a time chart for explaining an effect and advantage of the present embodiment.

FIG. 11 is a time chart of performing the control described above.

At time t11, the coast-stop condition is met at the time of accelerator-off. Accordingly, the power generation determined by the pre-engine-stop target power generation calculation is sent to the power generator 104. Further, the gear change is started so that the gear change ratio can move to the LOW side in accordance with the result of calculation of the target gear change ratio.

At time t12, the current gear change ratio becomes larger than the prescribed gear change ratio, and the engine stop processing is carried out. Subsequently, the electric oil pump is controlled so that its output is maintained to keep the gear change ratio. By increasing the power generation and raising the SOC before stopping the engine 101, the engine 101 can be stopped for longer time.

In the past technologies, the gear change control is performed regardless of the state of the preceding vehicle, so that an appropriate gear change ratio cannot be attained if a vehicle comes close to the preceding vehicle or travels slowly. The gear change ratio, therefore, should be optimized, taking longer time to restart acceleration. When the coast-stop state continues longer, the coast-stop sometimes cannot be continued due to the shortage of power from the battery for the electric oil pump that is operated to maintain the hydraulic pressure in the vehicle. In contrast, according to the above-described embodiments, when the acceleration is restarted from the engine-stop state by the operation of the acceleration pedal during traveling, a delay in responding to the acceleration request can be minimized.

REFERENCE SIGNS LIST 100 vehicle
101 engine
102 gear changer
103 power transmission mechanism
104 power generator
105 operating oil supply oil pump
106 electric oil pump
107 differential mechanism
108 driving wheel
109 battery
110 vehicle control device
112 starter motor
113 hydraulic control circuit
201 sensors
202 CPU
203 storage device

The invention claimed is:

1. A coast-stop control device configured to perform coast-stop control that automatically stops an engine while a vehicle is traveling, the vehicle including a power transmission mechanism capable of switching between an engagement state in which the power transmission mechanism is connected to an output shaft of the engine to allow transmission of a driving force and a release state in which the engagement is released, a gear change mechanism connected to the output shaft of the power transmission mechanism and connected to driving wheels to allow changing of a gear change ratio, the coast-stop control device comprising:

an engine-stop-condition determination unit configured to determine whether it is possible to stop the engine; and
a gear change control unit configured to control the gear change ratio of the gear change mechanism, wherein
the coast-stop control device controls the gear change mechanism to change to a prescribed gear change ratio in accordance with an output of an external recognition device when the engine-stop-condition determination unit determines that an engine stop condition is met,
the external recognition device is a vehicle detection unit configured to detect a vehicle existing in front of a vehicle of interest on which the external recognition device is mounted, and
when the preceding vehicle detection unit detects that an inter-vehicle distance between the vehicle of interest and the vehicle existing in front of the vehicle of interest is large and a vehicle speed of the vehicle of interest is high, the coast-stop control device brings the prescribed gear change ratio to a high side.

2. The coast-stop control device according to claim 1, wherein
the vehicle includes a power generator operated by the engine to generate power, and
the coast-stop control device increases power generation of the power generator when the external recognition device determines that an inter-vehicle distance between the vehicle of interest and the vehicle existing in front of the vehicle of interest is large and a vehicle speed of the vehicle of interest is high.

3. The coast-stop control device according to claim 1, wherein
the vehicle includes an operating oil supply pump capable of operating in synchronism with a rotation of the output shaft of the engine, and
an electric oil pump operating while the engine is automatically stopped.

\* \* \* \* \*